United States Patent Office 3,664,625
Patented May 23, 1972

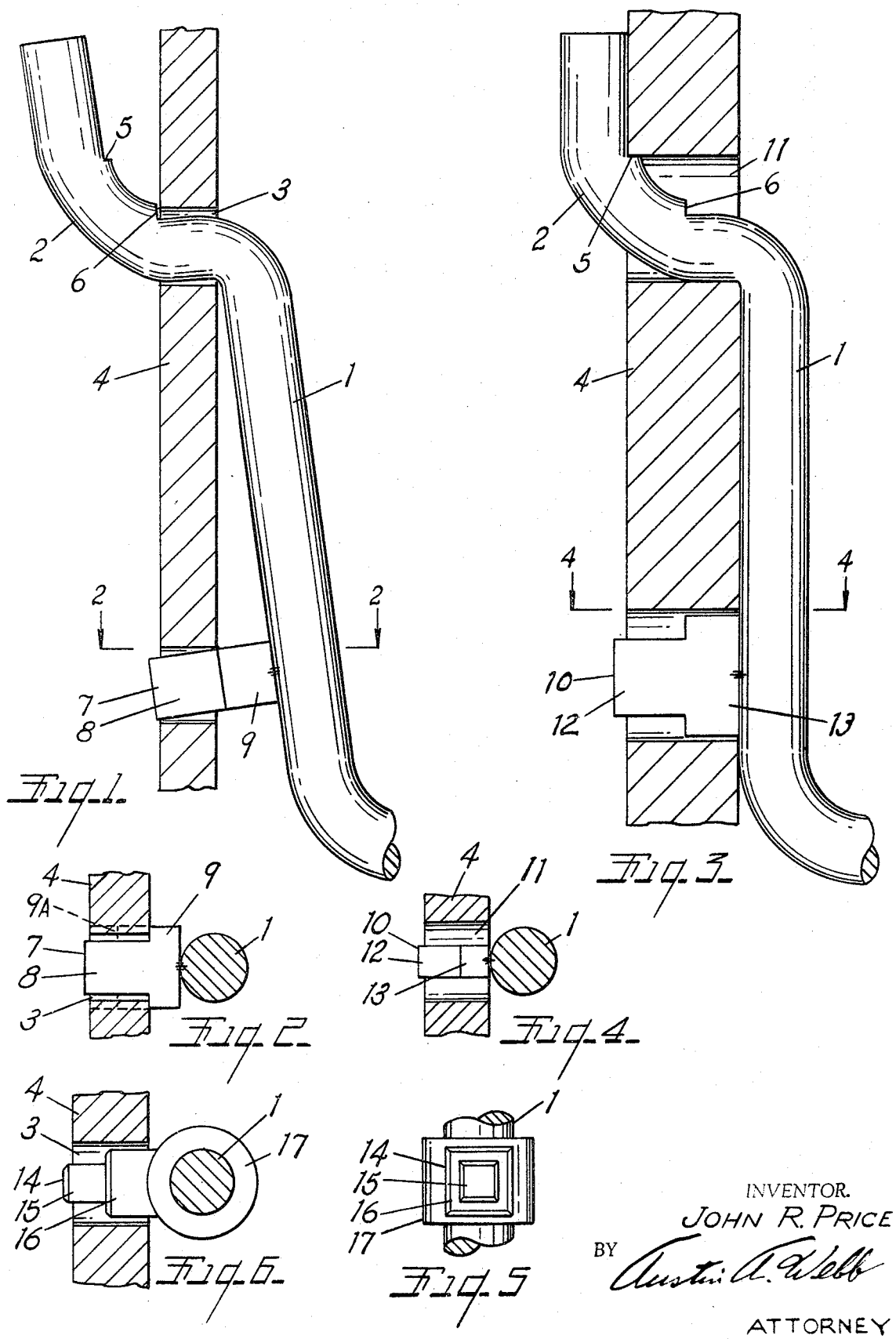

3,664,625
PEGBOARD HOOK FOR ALTERNATE
THICKNESS PEGBOARDS
John R. Price, Michigan City, Ind., assignor to Leigh
Products, Inc., Coopersville, Mich.
Filed Aug. 14, 1970, Ser. No. 63,762
Int. Cl. A47f 5/00
U.S. Cl. 248—223                                7 Claims

ABSTRACT OF THE DISCLOSURE

A vertical wire has a rearwardly turned hook at its upper end to engage through holes in thick or thin apertured panels. A stepped stud is secured to the wire below the upper hook to project into a lower hole in the apertured panel. The rear end of the stud is sized to fit within smaller holes in thin apertured panels, while the enlarged forward end is sized to fit into holes in thicker apertured panels. The stud is a flat block of generally rectangular cross section with the corners of the sections fitting the two sizes of holes. As an alternate, a stepped rectangular stud is molded on a supporting ring, and the ring is slid into position along the wire of the hook.

SUMMARY OF INVENTION

There are two more or less commercially standardized sizes of apertured panel sold for use with article supporting hooks. The holes in these panels are located at equal spacing, but the thickness of the panels and the diameters of the holes in each differ. It has previously been proposed to provide a single size hook that will fit either or both of the two standard panels.

This invention provides such a single size hook that fits both panels with equal security and ease of installation, which hooks are economical to manufacture. The dual use capability of the hook of the invention is created or provided by a stepped lower stud on the hook having a smaller rear portion sized to fit the smaller holes of one available panel, and a larger sized forward portion sized to fit in the larger sized holes but not fit into the smaller sized holes. The stepped stud is either a T-shaped metal piece having its cross portion welded to the wire of the hook, or an axially stepped and generally square block integrally molded on a ring or sleeve that fits telescopically over the wire of the hook in frictional gripping relation.

DESCRIPTION

The drawings, of which there is one sheet illustrate three alternative forms of the hook.

FIG. 1 is a fragmentary side elevational view of a first form of the hook engaged in a relatively thin apertured panel.

FIG. 2 is a cross sectional view on the line 2—2 in FIG. 1.

FIG. 3 is a fragmentary side elevational view of an alternative form of the hook engaged with a relatively thick apertured panel.

FIG. 4 is a cross sectional view along the line 4—4 in FIG. 3.

FIG. 5 is a fragmentary rear elevational view of the mid-portion of a hook with a lower hole engaging attachment thereon.

FIG. 6 is a transverse cross sectional view showing the stud on the attachment engaged in a large hole in a thick apertured panel.

The article support or hook shown on FIG. 1 consists of an upright wire 1 with a rearwardly turned upper end 2 sized to be inserted through the smallest size hole 3 formed in the thinner of two thicknesses of commercially available apertured panel 4. The upper end or hook 2 has two steps or notches 5 and 6 which are sized to engage the back of either thickness of apertured panel. This, and other, shaping of the upper ends of apertured panel hooks is an old expedient, and is not claimed as part of this invention.

Secured as by welding to the back of the wire 1 is a stud 7 which is located to penetrate into the next lower hole in the apertured panel. The stud is formed of flat metal stock and is generally T-shaped in outline. This produces a narrow rear projection 8 of rectangular cross section that is sized to fit the smaller holes in thin apertured panel. As shown best in FIG. 2, the wider front portion 9 of the stud forms a shoulder that seats against the front of the thin apertured panel. When the hook is applied to a thick apertured panel, the wider front portion 9 penetrates the wider holes, as shown by the dotted lines at 9A.

The modified form of hook shown in FIGS. 3 and 4 has the same upright wire body 1 and upper hooked end 2 engaged in a thick apertured panel. A similar stepped stud 10 is secured to the back of the wire to penetrate into larger holes 11 of a thick apertured panel. As in the case of the first stud, the stud 10 is a flat T-shaped element with a narrow rear projection 12 and a wider front cross element 13.

The portions 8 and 9 of the stud 7 and the portions 12 and 13 of the studs 10 are of rectangular cross section, and the thickness of the stock and the sizes of the sections are chosen so that the cross sections enter into the holes in the apertured panels. Thus the corners of the cross sections engage the edges of the holes along narrow lines. This permits easy insertion of the studs, and compensation for variations in the sizes of the holes from their nominal sizes.

FIGS. 5 and 6 show a further variation of the hook. A stud 14 is shaped as by molding to have a narrow or small rear portion 15 connected to a larger front portion 16. The portions 15 and 16 are square or rectangular and are sized to fit the two nominal sizes in apertured panels and may be beveled at their rear ends.

The forward end of the stud 14 is connected, as by being integrally molded therewith, to a cylindrical ring 17. The ring is sized to receive the upright wire 1 of the article supporting hook. The ring 17 may be slipped over the end of the hook and retained in position by friction or adhesive.

What is claimed a new is:

1. A hook for engagement with apertured panels and having an upper end shaped to fit either a thin or thick panel, and a rearwardly projecting stepped stud secured to a lower portion of the hook, said stud having a wide front portion projecting rearwardly from the back side of the hook and sized to fit into large panel holes, and a stepped narrower rear portion on said stud projecting centrally and rearwardly from the rear of said front portion and sized to fit into small panel holes, said front and rear portions having polygonal cross sections in planes parallel to the lower portion of the hook with edges of such portions engageable in the holes in the panel.

2. A hook as defined in claim 1 in which said studs are of flat metal stock T-shaped in outline with the wider cross part of the T welded to the hook.

3. A hook as defined in claim 2 in which the front portion of the stud is arranged vertically along the hook.

4. A hook as defined in claim 2 in which the front portion of the stud is arranged horizontally and transversely of the mid-section of the hook.

5. A hook as defined in claim 1 in which said stud is of molded plastic,
and a mounting ring integrally molded with said stud and retainingly embracing said hook.

6. A hook as defined in claim 1 in which said front and rear portions of said stud are rectangular in cross section.

7. A hook as defined in claim 5 in which said front and rear portions of said stud are of square cross section.

References Cited

UNITED STATES PATENTS

| | | | |
|---|---|---|---|
| 3,091,423 | 5/1963 | Butterworth | 248—225 |
| 3,482,709 | 12/1969 | Larson | 211—148 |
| 2,879,899 | 3/1959 | Shenkin | 211—55 |
| 3,401,909 | 9/1968 | Kalahar | 248—225 |
| 3,289,991 | 12/1966 | Kalahar | 248—225 |
| 2,790,616 | 4/1957 | Cardinal | 248—217 |

J. FRANKLIN FOSS, Primary Examiner

U.S. Cl. X.R.

248—Dig 3